United States Patent
Deghel et al.

(10) Patent No.: US 12,471,042 B2
(45) Date of Patent: Nov. 11, 2025

(54) ENABLING BEAM DIVERSITY FOR PHYSICAL UPLINK SHARED CHANNEL REPETITION

(71) Applicant: NOKIA TECHNOLOGIES OY, Espoo (FI)

(72) Inventors: Matha Deghel, Paris (FR); Keeth Jayasinghe, Espoo (FI)

(73) Assignee: Nokia Technologies Oy, Espoo (FI)

( * ) Notice: Subject to any disclaimer, the term of this patent is extended or adjusted under 35 U.S.C. 154(b) by 343 days.

(21) Appl. No.: 18/030,929

(22) PCT Filed: Sep. 22, 2021

(86) PCT No.: PCT/EP2021/076006
§ 371 (c)(1),
(2) Date: Apr. 7, 2023

(87) PCT Pub. No.: WO2022/083957
PCT Pub. Date: Apr. 28, 2022

(65) Prior Publication Data
US 2023/0389007 A1    Nov. 30, 2023

Related U.S. Application Data

(60) Provisional application No. 63/104,152, filed on Oct. 22, 2020.

(51) Int. Cl.
*H04W 56/00* (2009.01)
*H04B 7/0408* (2017.01)
(Continued)

(52) U.S. Cl.
CPC ........ *H04W 56/001* (2013.01); *H04B 7/0408* (2013.01); *H04B 7/0696* (2023.05); *H04W 72/044* (2013.01); *H04W 72/1268* (2013.01)

(58) Field of Classification Search
CPC ............ H04W 72/1268; H04W 72/044; H04B 7/0408; H04B 7/0696; H04B 7/0695
See application file for complete search history.

(56) References Cited

U.S. PATENT DOCUMENTS

2018/0288757 A1    10/2018    Sun et al.
2019/0349915 A1    11/2019    Ahn et al.
(Continued)

FOREIGN PATENT DOCUMENTS

| WO | 2012/023894 A1 | 2/2012 |
| WO | 2018/232090 A1 | 12/2018 |
| WO | 2021/229525 A2 | 11/2021 |

OTHER PUBLICATIONS

International Search Report and Written Opinion dated Jan. 20, 2022 corresponding to International Patent Application No. PCT/EP2021/076006.

(Continued)

*Primary Examiner* — Harry H Kim
(74) *Attorney, Agent, or Firm* — Lippes Mathias LLP

(57) ABSTRACT

Systems, methods, apparatuses, and computer program products for enabling beam diversity for physical uplink shared channel (PUSCH) repetition under multi-transmission points (TRP). A method may include receiving, from a network, a configuration with at least one time offset to account for at least one delay on switching from one transmit beam to another transmit beam, wherein the configuration defines at least one rule applicable to the at least one time offset. The method may also include determining a need for the at least one time offset between consecutive repetitions based on the configuration and the use of transmit beams for the consecutive repetitions. The method may further include applying, based on the determination, the at least one time offset between the consecutive repetitions. Further, a time (Continued)

domain allocation of at least one repetition of the consecutive repetitions may be changed to accommodate the at least one time offset.

18 Claims, 8 Drawing Sheets

(51) Int. Cl.
  *H04B 7/06* (2006.01)
  *H04W 72/044* (2023.01)
  *H04W 72/1268* (2023.01)

(56) References Cited

U.S. PATENT DOCUMENTS

| | | | | |
|---|---|---|---|---|
| 2020/0145998 | A1 | 5/2020 | Sun et al. | |
| 2021/0314041 | A1* | 10/2021 | Chang | H04B 7/0617 |
| 2022/0158715 | A1* | 5/2022 | Bishwarup | H04W 72/23 |
| 2022/0159683 | A1* | 5/2022 | Islam | H04W 72/1268 |
| 2022/0191709 | A1* | 6/2022 | Zhou | H04L 5/0053 |
| 2023/0171777 | A1* | 6/2023 | Yuan | H04B 7/06952 |
| | | | | 370/329 |
| 2023/0224874 | A1* | 7/2023 | Lin | H04L 1/1864 |
| | | | | 370/336 |
| 2023/0319816 | A1* | 10/2023 | Ali | H04L 27/26025 |
| | | | | 370/329 |
| 2023/0403702 | A1* | 12/2023 | Su | H04L 1/1896 |

OTHER PUBLICATIONS

Samsung, "New WID: Further enhancements on MIMO for NR," 3GPP Draft; RP-193133, 3GPP TSG RAN Meeting #86, Sitges, Spain, Dec. 9-12, 2019.

3GPP TS 38.213 V16.3.0 (Sep. 2020), Technical Specification, 3rd Generation Partnership Project; Technical Specification Group Radio Access Network; NR; Physical layer procedures for control (Release 16), Sep. 2020.

3GPP TS 38.214 V16.3.0 (Sep. 2020), Technical Specification, 3rd Generation Partnership Project; Technical Specification Group Radio Access Network; NR; Physical layer procedures for data (Release 16), Sep. 2020.

3GPP TS 38.331 V16.2.0 (Sep. 2020), Technical Specification, 3rd Generation Partnership Project, Technical Specification Group Radio Access Network; NR; Radio Resource Control (RRC) protocol specification (Release 16), Sep. 2020.

Notice of Allowance received for corresponding European Patent Application No. 21783424.1, dated Apr. 23, 2024, 8 pages.

* cited by examiner

ENABLING BEAM DIVERSITY FOR PHYSICAL UPLINK SHARED CHANNEL REPETITION

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for enabling beam diversity for physical uplink shared channel (PUSCH) repetition under multi-transmission or reception points (TRP).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bit rates on the order of 10-20 Gbit/s or higher, and will support at least enhanced mobile broadband (eMBB) and ultra-reliable low-latency communications (URLLC) as well as massive machine type communications (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

BRIEF DESCRIPTION OF THE DRAWINGS

For proper understanding of example embodiments, reference should be made to the accompanying drawings, wherein.

DETAILED DESCRIPTION

Figure 1:
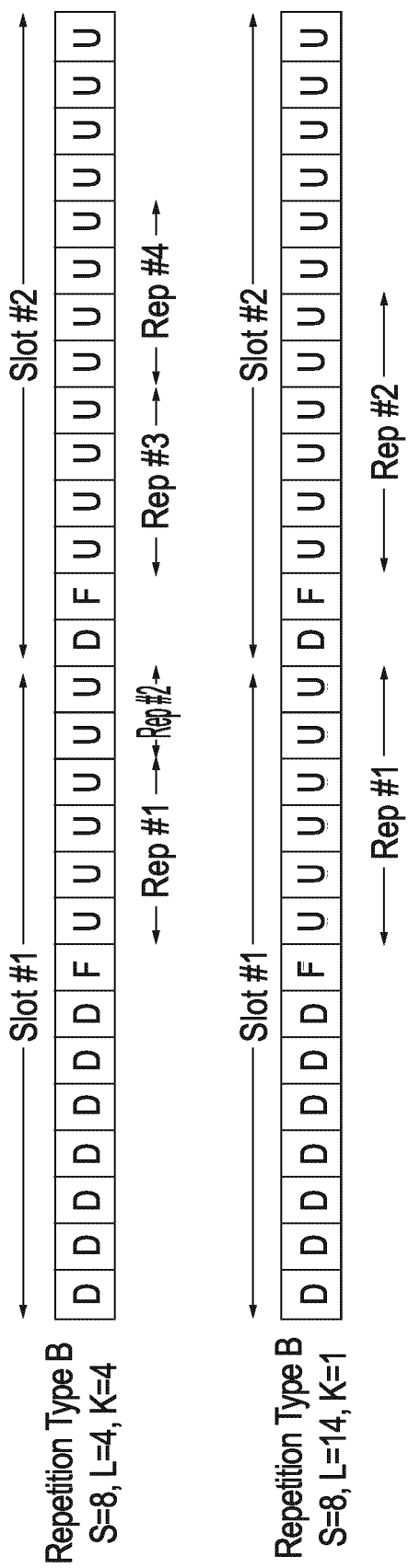
FIG. 1 illustrates examples of segmentation of nominal repetitions in a physical uplink share channel (PUSCH) repetition Type B.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for enabling beam diversity for physical uplink shared channel (PUSCH) repetition under multi-transmission or reception points (TRP).

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as merely illustrative of the principles and teachings of certain example embodiments, and not in limitation thereof.

$3^{rd}$ Generation Partnership Project (3GPP) Rel-15 describes physical uplink shared channel (PUSCH) repetition via slot aggregation supported in a semi-static way, i.e. there is no repetition within a slot, with aggregation factor of 2, 4, or 8. According to Rel-15, this repetition operation may be referred to as slot-based repetition. Further, Rel-16 describes PUSCH repetition Type B. In particular, PUSCH enhancements in Rel-16 may allow one allocation cross-slot-boundary and cross-downlink (DL)-symbols scheduling for reduced latency without sacrificing reliability. This may also be known as multi-segment transmission in SI phase. In addition, Rel-16 describes PUSCH enhancements for both dynamic-grant based PUSCH and configured-grant based PUSCH. For a transport block, one dynamic uplink (UL) grant or one configured grant schedules two or more PUSCH repetitions that can be in one slot, or across a slot boundary in consecutive available slots.

As described in Rel-16, the time resource for PUSCH repetition Type B may be defined by S (starting symbol), L (length of each nominal repetition), and K (number of nominal repetitions), which may be signaled as part of the time domain resource allocation (TDRA) entry. Further, the TDRA field in downlink control information (DCI) may indicate one of the entries in the TDRA table, and the PUSCH transmission may occur within the time window of L*K symbols, starting from the indicated starting symbol.

In Rel-16, one nominal repetition may be segmented into one or more actual repetitions around semi-static DL symbols, and dynamically indicated/semi-statically configured invalid UL symbols (if applicable) and/or at the slot boundary. For a dynamic grant, the actual repetitions may be transmitted. In this case, there may not be any conflict between the transmitted symbols and the dynamic DL/flexible symbols (indicated by a dynamic slot format indicator (SFI)). On the other hand, for a configured grant, whether the actual repetition is transmitted or not follows the Rel-15 principle. For instance, it may not be transmitted if it conflicts with any dynamic DL/flexible symbols. In addition, it may be not transmitted if it conflicts with any semi-static flexible control if dynamic SFI is configured but not received.

FIG. 1 illustrates examples of segmentation of nominal repetitions in PUSCH repetition Type B. In particular, the nominal repetitions in PUSCH repetition Type B may correspond to repetitions that may be segmented into multiple actual repetitions. In 3GPP, a new radio resource control (RRC) parameter, InvalidSymbolPattern, may define an invalid symbol pattern for PUSCH repetition Type B (not applicable to any other UL transmission). In doing so, it may be possible to avoid certain physical uplink control channel (PUCCH)/sounding reference signal (SRS) at the end of the slot and DL/UL switching gap.

Furthermore, Rel-17 describes certain PUSCH enhancements for multi-TRP. For instance, Rel-17 describes enhancements on the support for multi-TRP deployment, where one objective may include identifying and specifying features to improve reliability and robustness for channels other than physical downlink shared channel (PDSCH) (i.e., PDCCH, PUSCH, and PUCCH) using multi-TRP and/or multi panel, with Rel-16 reliability features as the baseline.

With regard to PUSCH enhancements for multi-TRP, 3GPP describes that, for a single DCI based M-TRP PUSCH reliability enhancement, support of TDMed PUSCH repetition scheme(s) may be based on Rel-16 PUSCH repetition Type A and Type B. Thus, in Rel-17, the PUSCH enhancements may be time division multiplexing (TDM) PUSCH repetitions toward different TRPs where, for example, two UL beams may be used for the group of PUSCH repetitions. Further, UL beam, UL transmission configuration indicator (TCI) state, spatial relation, SRS resource indicator (SRI), and UL transmit special filter may refer to the same thing, and may be used interchangeably.

Additionally, in 3GPP, on the mapping between PUSCH repetitions and beams in single DCI based multi-TRP PUSCH repetition Type A and Type B, it is being studied how the beams are mapped to different PUSCH repetitions (or slots/frequency hops). For PUSCH repetition Type B, it is being studied which repetition type that the beams may consider for the mapping. In addition, consideration may be given to additional requirements on switching gap(s) between two PUSCH repetitions towards different TRPs considering beam switching latency aspects. That is, consideration may be made on UL beam switching gaps in case of PUSCH repetitions towards different TRPs. Specifically, in certain cases, UL beam switching may not require switching/activating a different panel (i.e., the UL beams may be from the same panel). In other cases, UL beam switching may involve switching/activating a different panel. Further, the beam switching latency may be different for these two cases.

As noted above, in TDM PUSCH repetitions toward multiple TRPs, at least two UL beams may be used for the group of PUSCH repetitions. For PUSCH repetition Type B, some of the actual repetitions may be consecutive with zero time-gap in-between. In addition, there may be other actual repetitions where there is a time-gap in-between resulting essentially from PUSCH segmentation around semi-static DL symbols, and invalid UL symbols and at the slot boundary.

In terms of enabling beam diversity for PUSCH, there may be cases where, for example, each of two consecutive PUSCH (Type B) repetitions is associated with a different (UL) beam (i.e., spatial relation or UL TCI state). However, depending on the beam mapping to PUSCH repetitions and the time needed to switch from one beam to another, there may be cases that result in certain issues. For instance, the time gap between two repetitions may not be enough for UL beam switching. This may be problematic as the UE may not have enough time to switch beams in some cases. In this regard, beam switching delay may depend on whether the concerned beams are from the same or different panels, and whether the panels are both already active or one needs to be activated. This issue may be a result of the time allocation of the existing PUSCH repetition operation(s) not accounting for beam switching delay(s). However, this issue needs to be resolved in order to enable PUSCH (Type B) repetition along with beam diversity (e.g., PUSCH repetition towards multiple TRPs). In view of these issues, certain example embodiments may provide one or more ways of enabling UL beam diversity for PUSCH repetition Type B with multiple-TRP operation, and taking into account the beam switching delay(s).

In certain example embodiments, to enable UL beam diversity for PUSCH repetition Type B with multi-TRP operation, the network may know the time or delay needed to switch from one UL beam to another. In some example embodiments, for the network to know the time or delay needed to switch from one UL beam to another, the UE may provide the network with information including its beam switching capability. In other example embodiments, the UE may determine whether to apply a time offset/gap between two PUSCH repetitions, each associated with a different UL beam. In certain example embodiments, the determination may be based on a configuration or indication from the network as well as the beams indicated/configured for these PUSCH repetitions.

According to certain example embodiments, the network may configure or indicate the UE with at least one time offset, and define the rule(s) or method(s) to apply for the time offset(s). In some example embodiments, the time offset(s) may represent the time required for the UE to switch from one UL beam to another. The time offset may also be dependent upon whether or not a switching/activating panel is required for switching the UL beam. That is, the time offset may depend on an identity of the UL beams indicated/configured for (i.e. associated with) the PUS CH repetitions. In other example embodiments, in addition to the above, the network may separately configure a mapping principle for actual repetition or nominal repetitions with indicated beams.

In certain example embodiments, to determine the updated actual PUSCH repetitions, given the corresponding UL beam mapping, the UE may consider whether it needs to apply the configured or indicated time offset(s) based on the defined rule(s) or method(s) for each pair of consecutive actual PUSCH repetitions. The aspect of whether the UE needs to apply the configured or indicated time offset(s)

(based on the define rule(s)) may be referred to as a 'feasibility' of applying this time offset(s). In some example embodiments, at least one actual repetition may be discarded as a result of applying the time offset(s) and rule(s). In other example embodiments, the duration of at least one actual repetition may be updated (updated actual repetition) as a result of applying the time offset(s) and rule(s). In further example embodiments, if the consecutive actual PUSCH repetitions use the same beam, the time offset(s) may not be applicable between the PUSCH repetitions. Further, in other example embodiments, the UE may apply beam mapping for actual or nominal PUSCH repetitions based on the configured mapping principle, and use that to determine which PUSCH repetition pairs need to be considered with the rule(s).

According to certain example embodiments, for the pairs of consecutive actual PUSCH repetitions for which a time offset is required, various rules or methods may be defined. For instance, according to some example embodiments, each symbol that overlaps with the corresponding offset may be muted, where the offset may be applied from the last symbol of the earlier actual PUSCH repetition (i.e., the first actual PUSCH repetition of a pair). Here, the symbols may be muted in the second actual PUSCH repetition of a pair. According to other example embodiments, at least one symbol from each actual PUSCH repetition (in a pair) may be muted to facilitate time offset between repetitions. According to further example embodiments, symbols may be muted from the actual PUSCH repetition (in a pair) with the lower or larger number of symbols.

In certain example embodiments, symbols may be muted from the actual PUSCH repetitions by, for example, muting symbols in an even manner between the repetitions. This could, for example, be applied in a case where the concerned actual repetitions have the same number of symbols. In other example embodiments, if the time offset overlaps with already unused or invalid UL symbols, the DL symbols, and/or flexible symbols (when applicable), the UE may account for them as muted symbols when applying the offset. For example, the invalid UL symbols, already muted symbols, DL symbols, and/or flexible symbols (when applicable) may be counted as part of the offset. Alternatively, the offset may be applied without counting the invalid symbols, DL symbols, and/or flexible symbols as part of this offset (e.g., if the network already has taken this into account). In further example embodiments, the flexible symbols may be considered for PUSCH repetition, and the above consideration of accounting flexible symbols may then not be applicable.

According to certain example embodiments, the UE may apply the above procedure for the consecutive actual PUSCH repetitions for which a time offset is needed. Alternatively, or additionally, the network may configure the UE with multiple invalid symbol patterns, and associate each pattern to at least one entry of the related configured TDRA table, where the invalid symbol patterns may take into account the beam switching delay(s). In other words, the invalid symbols may also include muted or invalid symbols due to the time needed for beam switching. Then, based on the indicated TDRA entry, the UE may know which pattern to apply. Alternatively, in other example embodiments, there may be an explicit dynamic indication signaled to the UE. For example, the explicit dynamic indication may be signaled to the UE via DCI (or medium access control (MAC) control element (CE)) to indicate which invalid symbol pattern to apply among the multiple configured invalid symbol patterns.

Figure 2:
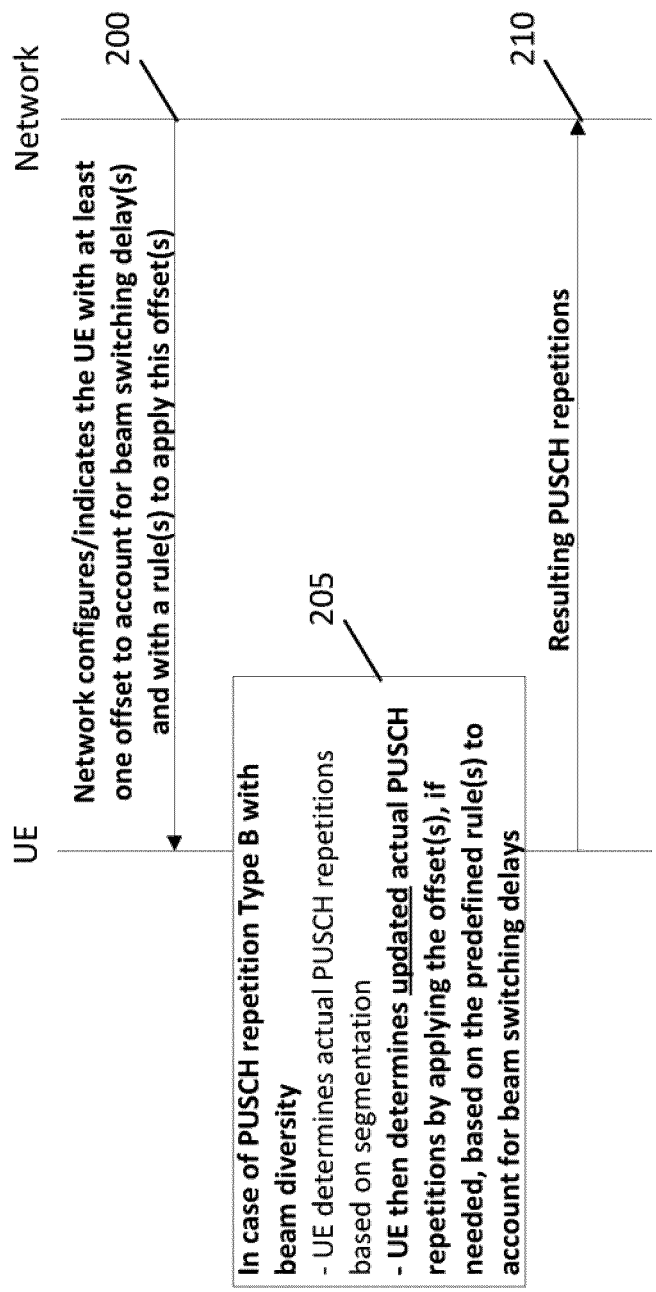
FIG. 2 illustrates a signal flow diagram of an operation to enable UL beam diversity for PUSCH repetition, according to certain example embodiments.

FIG. 2 illustrates a signal flow diagram of an operation to enable UL beam diversity for PUSCH repetition, according to certain example embodiments. In particular, FIG. 2 illustrates an operation to enable UL beam diversity for PUSCH repetition, taking into account beam switching delay(s). According to certain example embodiments, the operation illustrated in FIG. 2 may apply to dynamic-grant PUSCH as well as configured-grant PUSCH. In certain example embodiments, the UL beam (or simply beam), UL TCI state, spatial relation, SRI, and UL transmit spatial filter may refer to the same thing, and may be used interchangeably.

As illustrated in FIG. 2, at 200, the network may configure or indicate the UE with at least one offset to account for beam switching delay(s), and with a rule(s) to apply this offset(s). Further, at 205, in case of PUSCH repetition type B with beam diversity, the UE may determine actual PUSCH repetitions based on segmentation. The UE may then determine updated actual PUSCH repetitions by applying the offset(s), if needed, based on the predefined rule(s) to account for beam switching delays. At 210, the UE may transmit the resulting (i.e., updated actual) PUSCH repetitions to the network.

Figure 3:
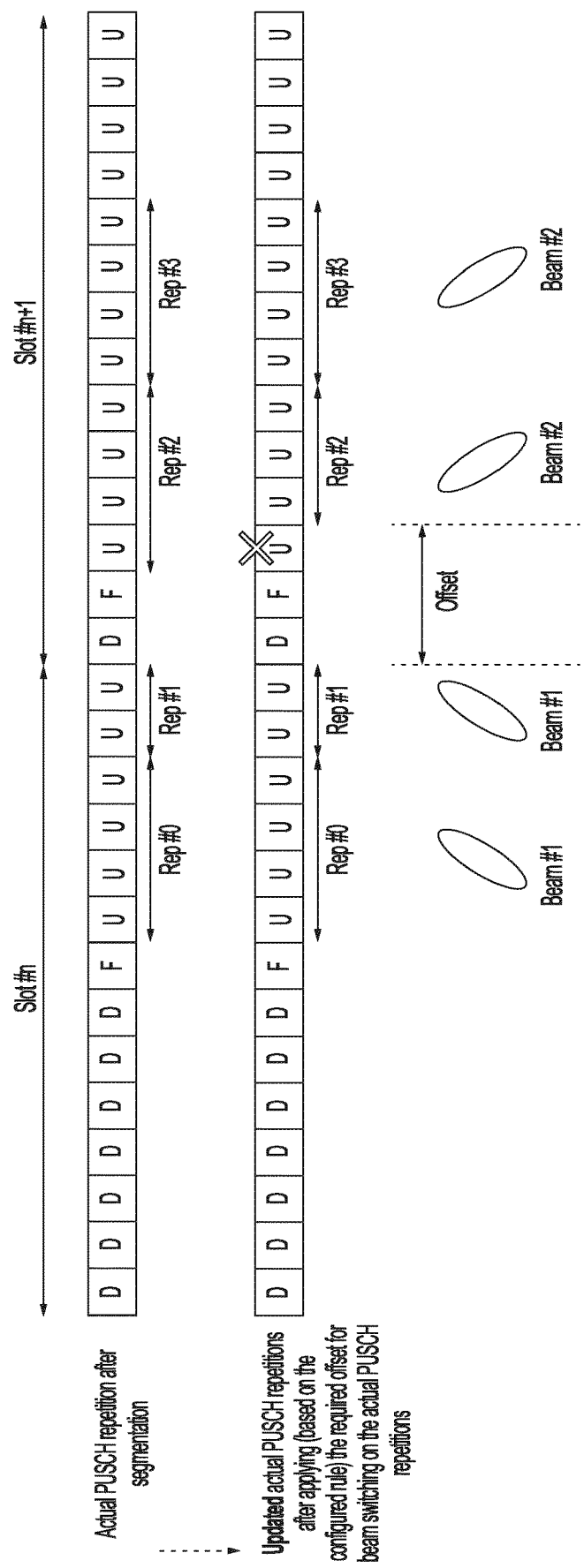
FIG. 3 illustrates an operation to enable uplink (UL) beam diversity for PUSCH repetition Type B, according to certain example embodiments.

FIG. 3 illustrates an operation to enable UL beam diversity for PUSCH repetition Type B, according to certain example embodiments. In the example of FIG. 3, beam switching delay(s) may be taken into account. As illustrated in FIG. 3, the UE may be configured or instructed to perform PUSCH Type B repetition with UL beam diversity. Specifically, the time resource allocation in the example of FIG. 3 may include S=8 (starting symbol), L=4 (length of each nominal repetition), and K=4 (number of nominal repetitions), which are signaled as part of the TDRA entry. As illustrated in FIG. 3, after the PUSCH segmentation operation, there may be 4 actual PUSCH repetitions. In addition, two UL beams may be considered, where the first beam (beam #1) may be mapped to the first two actual repetitions, and the second UL beam (beam #2) may be mapped to the last two actual repetitions (sequential mapping principle). In certain example embodiments, it may be assumed that the UE may need a delay equivalent of 3 symbols to switch from beam #1 to beam #2. In some example embodiments, this assumption may be due to a need to switch from one panel to another.

In the example of FIG. 3, the configured rule to apply the offset may be set such that the UE is configured to apply the offset after the ending symbol of the earlier actual PUSCH repetition of the two consecutive repetitions where switching beam is needed. According to certain example embodiments, if the offset overlaps with already muted symbols, DL symbols, flexible symbols (when applicable), and/or invalid UL symbols (when applicable) configured for PUSCH, the UE may be configured to account for the already muted symbols, the DL/flexible symbols, and/or the invalid symbols when applying the offset. Given this configured rule and offset value (3 symbols), the UE may apply the offset just after the ending symbol of Rep #1, taking into account the presence of two DL and flexible symbols. This may result in muting the first symbol of the actual Rep #2. Thus, the impact of applying the offset is that the resulting Rep #2 has a length of 3 symbols instead of 4 symbols.

Figure 4:
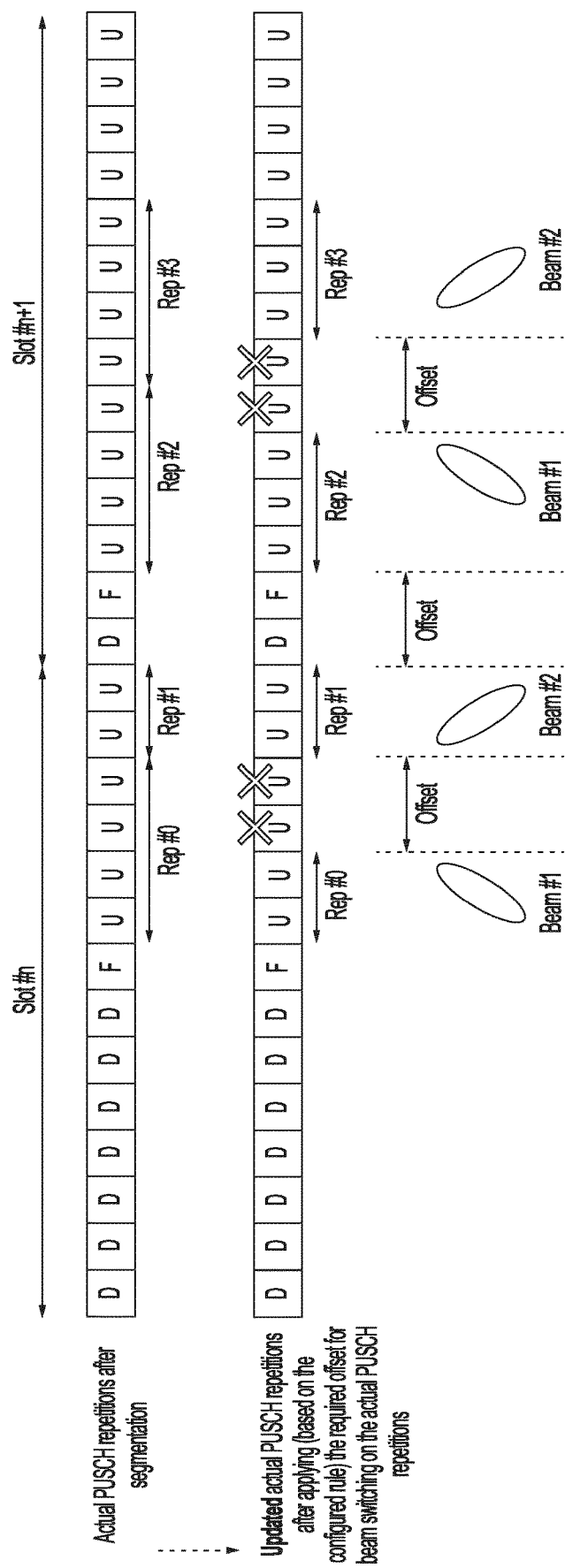
FIG. 4 illustrates another operation to enable UL beam diversity for PUSCH repetition Type B, according to certain example embodiments.

FIG. 4 illustrates another operation to enable UL beam diversity for PUSCH repetition Type B, according to certain example embodiments. In the example of FIG. 4, beam switching delay(s) may be taken into account. Further, in this example, the same number of repetitions and time-domain allocations may be configured, as with the example illustrated in FIG. 3, except with a different beam mapping principle (cyclical beam mapping). As illustrated in FIG. 3, due to the new beam mapping pattern, there may be three instances where beam switching is expected/needed. Further, it may be assumed that the time offset is equal to two symbols, and it is the same for all three switching instances.

In the example of FIG. 4, the applicable configured rule and offset may be that for two consecutive actual repetitions where the beam switching is needed, symbols may be muted from the PUSCH repetition with the larger number of symbols. If the actual repetitions have the same number of symbols, then the symbols may be muted from the two concerned repetitions by, for example, muting symbols in an even manner between the repetitions. If, however, the offset overlaps with the already muted symbols, DL symbols, flexible symbols (when applicable), and/or invalid symbols (when applicable) configured for PUSCH, the UE may be configured to account for the already muted symbols, DL symbols, flexible symbols (when applicable), and/or invalid symbols (when applicable) when applying the offset.

According to certain example embodiments, after applying PUSCH segmentation to determine the actual PUSCH repetitions, the UE may determine, starting from the first to last in time, whether to apply the configured offset(s) for each pair of consecutive (non-discarded) actual PUSCH repetitions. In the example illustrated in FIG. 4, there may be three beam switching instances. The first beam switching instance may be between Rep #0 and Rep #1, and the second beam switching instance may be between Rep #1 and Rep #2. Further, the third beam switching instance may be between Rep #2 and Rep #3. According to certain example embodiments, each beam switch may include applying an offset of two symbols.

Given the configured rule and offset value in FIG. 4, the last two symbols from Rep #0 may be muted, as the actual repetition Rep #0 has a larger number of symbols compared to the actual repetition #1. Further, no symbols are muted from Rep #1 and Rep #2 since the offset is fully overlapping with two DL and flexible symbols. As illustrated in FIG. 4, the last symbols of Rep #2 and the first symbol of Rep #3 may be muted since the actual Rep #2 and the actual Rep #3 have the same number of symbols. Further, the configured rule may include evenly muting symbols from the concerned actual repetitions.

Figure 5:
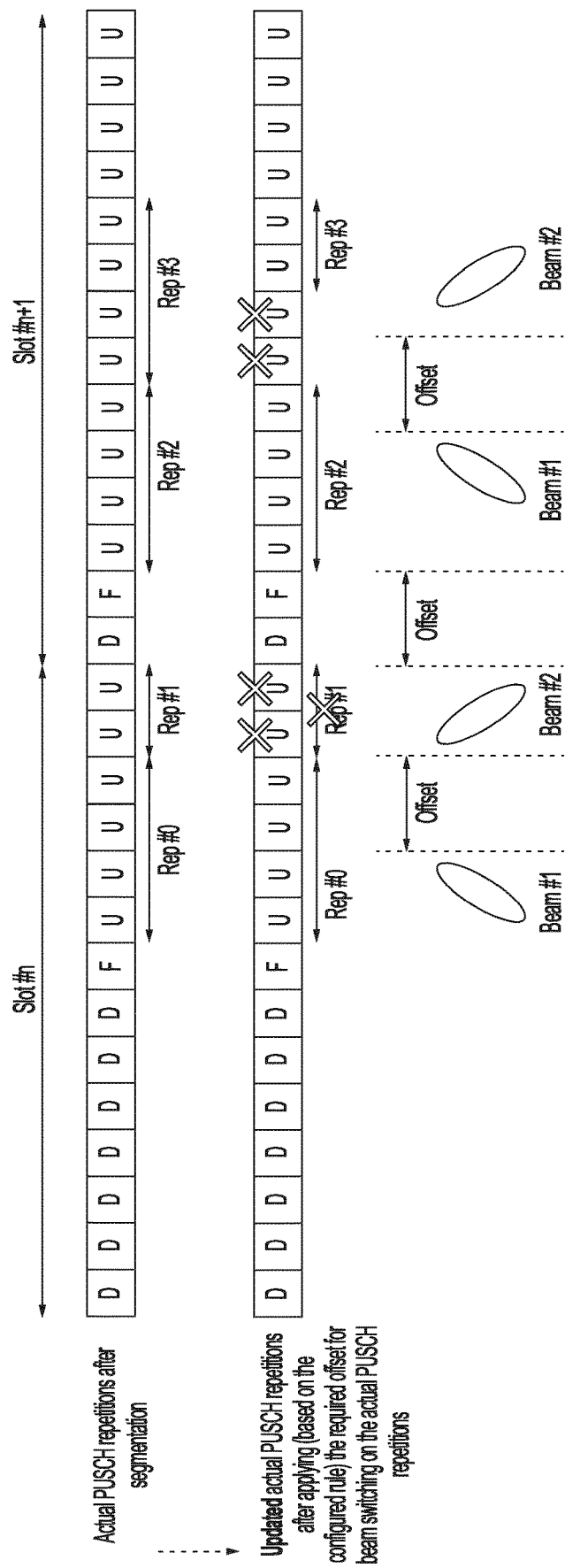
FIG. 5 illustrates a further operation to enable UL beam diversity for PUSCH Type B, according to certain example embodiments.

FIG. 5 illustrates a further operation to enable UL beam diversity for PUSCH Type B, according to certain example embodiments. In particular, the operation may take into account beam switching delay(s). According to certain example embodiments, the example illustrated in FIG. 5 may be similar to that of FIG. 4. However, the rules to apply the offset may be the same as the rules of the example illustrated in FIG. 3. With FIG. 5, the configured rule may be configured or defined to apply the offset just after the ending symbol of the earlier actual repetition. Then, the two symbols of the actual repetition Rep #1 may be muted. Consequently, Rep #1 may be discarded or dropped. In addition, the first two symbols of Rep #3 may be muted.

In certain example embodiments, if, as a result of muting symbols due to applying the offset, when a PUSCH repetition ends up with a single symbol, then this repetition may be discarded or dropped. An exception may be for the case where the length of the corresponding nominal repetition is equal to 1 (i.e., L=1). According to certain example embodiments, this rule may follow the same rule when performing segmentation, where an actual repetition with a single symbol, except for L=1, is not transmitted. Although certain example embodiments described herein may pertain to PUSCH repetition Type B, other example embodiments may be applicable for PUSCH repetition Type A (also known as inter-slot PUSCH repetition, or Rel-15 PUSCH with slot aggregation) if needed.

Figure 6:
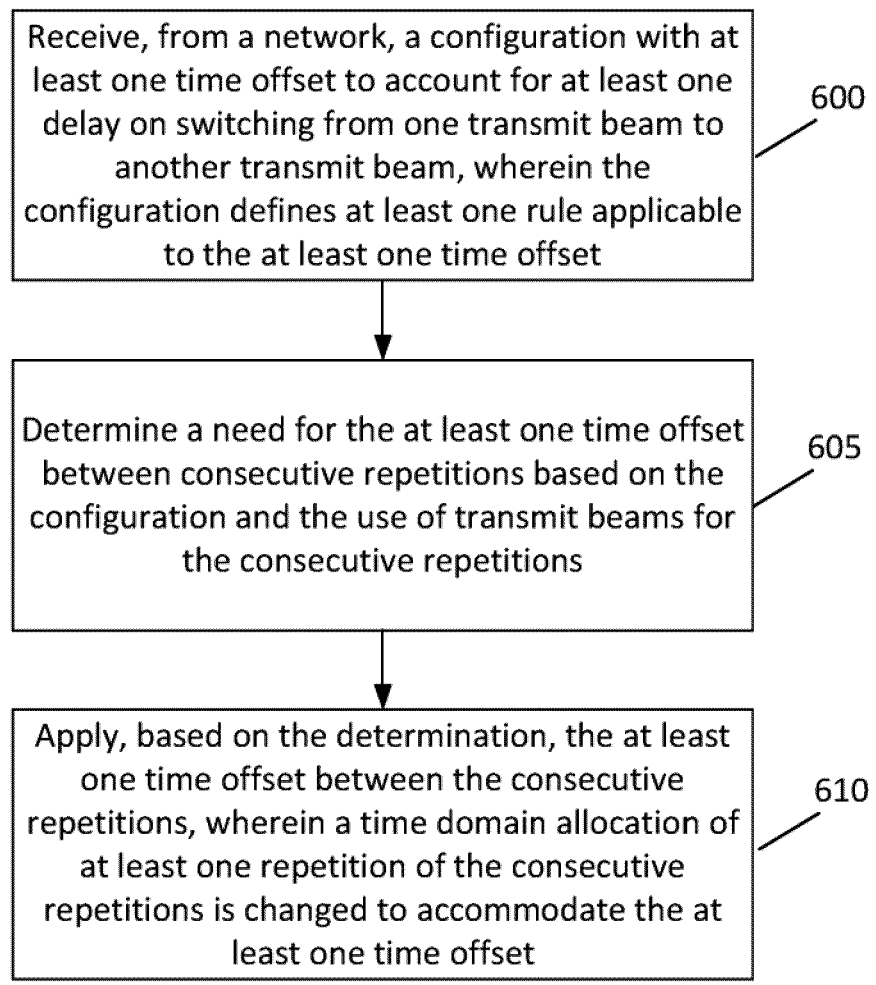
FIG. 6 illustrates a flow diagram of a method, according to certain example embodiments.

FIG. 6 illustrates a flow diagram of a method, according to certain example embodiments. In certain example embodiments, the flow diagram of FIG. 6 may be performed by a telecommunications network, network entity or network node in a 3GPP system, such as LTE or 5G-NR. For instance, in an example embodiment, the method of FIG. 6 may be performed by a UE, for instance similar to apparatuses 10 or 20 illustrated in FIGS. 8(a) and 8(b).

According to certain example embodiments, the method of FIG. 6 may include, at 600, receiving, from a network, a configuration with at least one time offset to account for at least one delay on switching from one transmit beam to another transmit beam. In certain example embodiments, the configuration may define at least one rule applicable to the at least one time offset. The method may also include, at 605, determining a need for the at least one time offset between consecutive repetitions based on the configuration and a use of transmit beams for the consecutive repetitions. The method may further include, at 610, applying, based on the determination, the at least one time offset between the consecutive repetitions. In certain example embodiments, a time domain allocation of at least one repetition of the consecutive repetitions may be changed to accommodate the at least one time offset.

According to certain example embodiments, the consecutive repetitions correspond to actual physical uplink shared channel (PUSCH) repetitions. According to other example embodiments, the method may also include determining at least one updated actual physical uplink shared channel (PUSCH) repetition based on the application of the at least one time offset and the at least one rule applicable or associated to the at least one time offset. According to other example embodiments, the at least one time offset between two consecutive repetitions may be applied only based on the determination of a need for the at least one time offset and when each repetition is associated with a different transmit beam. According to further example embodiments, the determining the need for the at least one time offset may include determining a feasibility of applying the at least one time offset based on the at least one rule for at least one pair of consecutive repetitions. In certain example embodiments, the configuration may include a mapping principle for actual physical uplink shared channel (PUSCH) repetitions or nominal PUSCH repetitions with indicated beams. In some example embodiments, the actual physical uplink shared channel (PUSCH) repetitions may be determined based on a channel segmentation operation.

According to certain example embodiments, the method may further include discarding at least one actual physical uplink shared channel (PUSCH) repetition as a result of applying the at least one time offset. According to other example embodiments, the method may also include updating a duration of at least one actual physical uplink shared channel (PUSCH) repetition as a result of applying the at least one time offset and the at least one rule. According to further example embodiments, when consecutive actual physical uplink shared channel (PUSCH) repetitions use the same beam, the at least one time offset may not applicable between the actual PUSCH channel repetitions. In certain example embodiments, for pairs of consecutive actual physical uplink shared channel (PUSCH) repetitions for which the at least one time offset is required, the method may include muting at least one symbol that overlaps with a corresponding at least one time offset, wherein the at least one time offset is applied from a last symbol of an earlier actual PUSCH repetition of a pair of consecutive actual PUSCH repetitions, muting at least one symbol from each actual PUSCH repetition of a pair of consecutive actual PUSCH repetitions to facilitate at least one time offset between repetitions, muting at least one symbol from the actual PUSCH repetition of a pair of consecutive actual PUSCH repetitions with a lower or larger number of symbols, or muting at least one symbol from at least one actual PUSCH repetition of a pair of consecutive actual PUSCH repetitions by muting the symbols in an even manner between the actual PUSCH repetitions.

In some example embodiments, the method may further include accounting for unused or invalid uplink symbols, downlink symbols, and/or flexible symbols when the at least one time offset overlaps with the unused or invalid uplink symbols, the downlink symbols, or the flexible symbols. In other example embodiments, the configuration may include an indication of a plurality of invalid symbol patterns. In other example embodiments, each pattern of the plurality of invalid symbol patterns may be associated with at least one entry of a related configured time domain resource allocation table. According to certain example embodiments, the plurality of invalid symbol patterns may take into account at least one beam switching delay(s).

Figure 7:
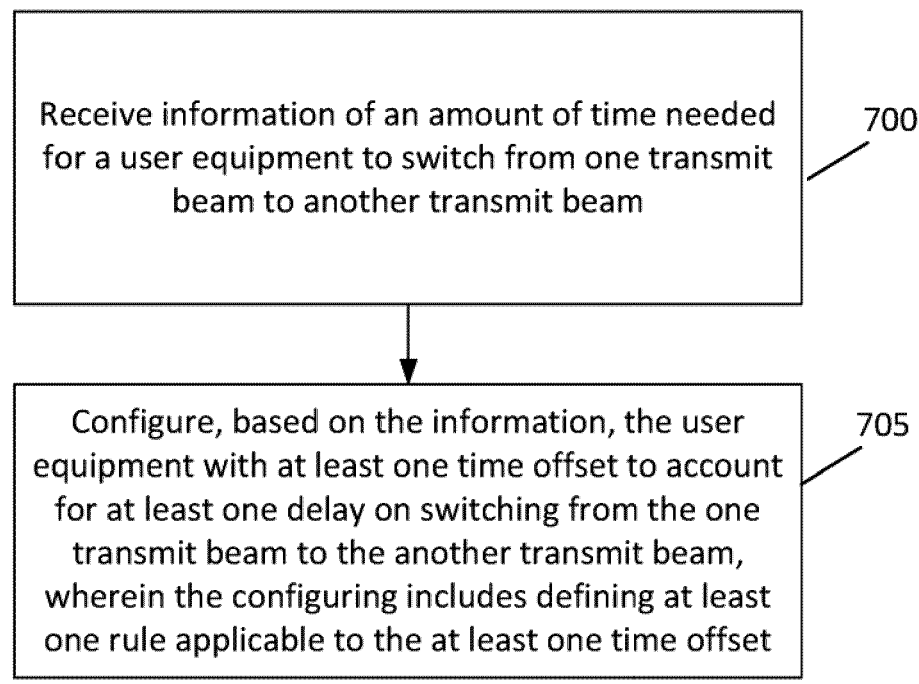
FIG. 7 illustrates a flow diagram of another method, according to certain example embodiments.

FIG. 7 illustrates a flow diagram of another method, according to certain example embodiments. In certain example embodiments, the flow diagram of FIG. 7 may be performed by a telecommunications network, network entity or network node in a 3GPP system, such as LTE or 5G-NR. For instance, in an example embodiment, the method of FIG. 7 may be performed by a network, an element of a network node or the network node itself, for instance similar to apparatuses 10 or 20 illustrated in FIGS. 8(a) and 8(b).

According to certain example embodiments, the method of FIG. 7 may include, at 700, receiving information of an amount of time needed for a user equipment to switch from one transmit beam to another transmit beam. The method may also include, at 705, configuring, based on the information, the user equipment with at least one time offset to account for at least one delay on switching from the one transmit beam to the another transmit beam. In certain example embodiments, the configuring may include defining at least one rule applicable to the at least one time offset.

According to certain example embodiments, the method may further include configuring the user equipment with a mapping principle for an actual physical uplink shared channel (PUSCH) repetition or a nominal PUSCH repetition with indicated beams. According to further example embodiments, for pairs of consecutive actual physical uplink shared channel (PUSCH) repetitions for which the at least one time offset is required, the rule may include muting at least one symbol that overlaps with a corresponding at least one time offset, wherein the at least one time offset may be applied from a last symbol of an earlier actual PUSCH repetition of a pair of consecutive actual PUSCH repetitions, muting at least one symbol from each actual PUSCH repetition of a pair of consecutive actual PUSCH repetitions to facilitate at least one time offset between repetitions, muting at least one symbol from the actual PUSCH repetition of a pair of consecutive actual PUSCH repetitions with a lower or larger number of symbols, or muting at least one symbol from at least one actual PUSCH repetition of a pair of consecutive actual PUSCH repetitions by muting symbols in an even manner between the actual PUSCH repetitions.

In certain example embodiments, the method may further include configuring the user equipment with a plurality of invalid symbol patterns. In other example embodiments, the method may also include associating each pattern of the plurality of invalid symbol patterns to at least one entry of a related configured time domain resource allocation table. In some example embodiments, the plurality of invalid symbol patterns may take into account at least one beam switching delay. According to certain example embodiments, the plurality of invalid symbols may include muted or invalid symbols due to a needed at least one beam switching time.

Figure 8A:
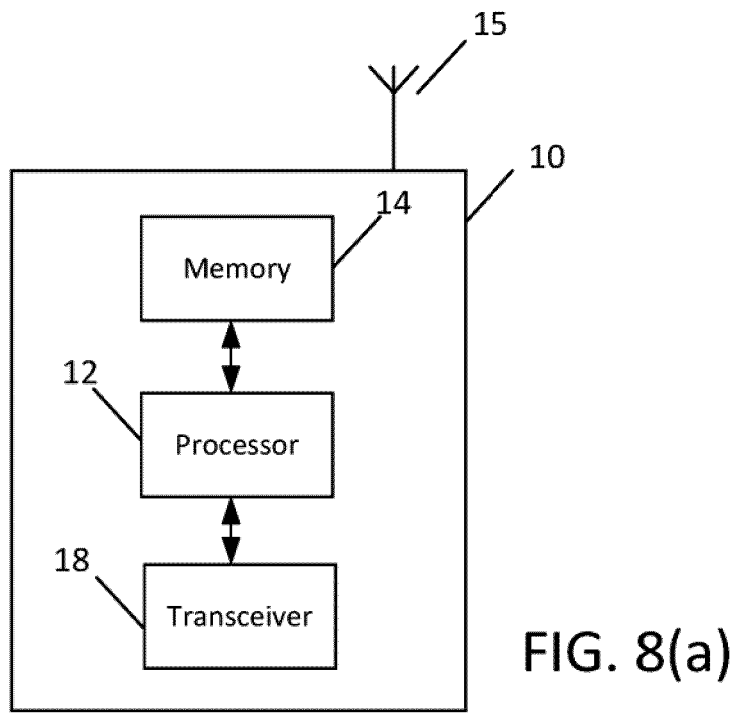
FIG. 8(a) illustrates an apparatus, according to certain example embodiments.
Figure 8B:
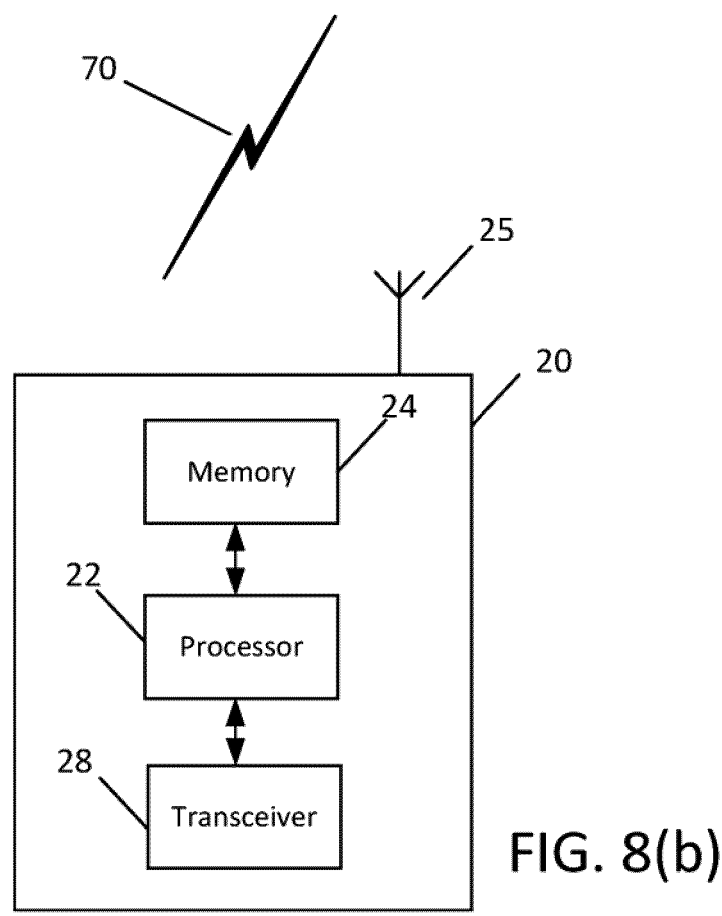
FIG. 8(b) illustrates another apparatus, according to certain example embodiments.

FIG. 8(a) illustrates an apparatus 10 according to certain example embodiments. In certain example embodiments, apparatus 10 may be a node or element in a communications network or associated with such a network, such as a UE, mobile equipment (ME), mobile station, mobile device, stationary device, IoT device, or other device. It should be noted that one of ordinary skill in the art would understand that apparatus 10 may include components or features not shown in FIG. 8(a).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 8(a).

As illustrated in the example of FIG. 8(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8(a), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-6.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-6.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

As discussed above, according to certain example embodiments, apparatus 10 may be a UE, for example. According to certain example embodiments, apparatus 10 may be controlled by memory 14 and processor 12 to perform the functions associated with example embodiments described herein. For instance, in certain example embodiments, apparatus 10 may be controlled by memory 14 and processor 12 to receive, from a network, a configuration with at least one time offset to account for at least one delay on switching from one transmit beam to another transmit beam. In certain example embodiments, the configuration may define at least one rule applicable to the at least one time offset. Apparatus 10 may also be controlled by memory 14 and processor 12 to determine a need for the at least one time offset between consecutive repetitions based on the configuration and identity use of transmit beams for the consecutive repetitions. Apparatus 10 may further be controlled by memory 14 and processor 12 to apply, based on the determination, the at least one time offset between the consecutive repetitions. In certain example embodiments, a time domain allocation of at least one repetition of the consecutive repetitions may be changed to accommodate the at least one time offset.

FIG. 8(*b*) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), WLAN access point, and/or a network element in the gNB, associated with a radio access network (RAN), such as an LTE network, 5G or NR. It should be noted that one of ordinary skill in the art would understand that apparatus 20 may include components or features not shown in FIG. 8(*b*)

As illustrated in the example of FIG. 8(*b*), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8(*b*), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-5 and 7.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-5 and 7.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a network element, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

As discussed above, according to certain example embodiments, apparatus 20 may be a communication network, for example. According to certain embodiments, apparatus 20 may be controlled by memory 14 and processor 12 to perform the functions associated with example embodiments described herein. For instance, in certain example embodiments, apparatus 20 may be controlled by memory 24 and processor 22 to receive information of an amount of time needed for a user equipment to switch from one transmit beam to another transmit beam. Apparatus 20 may also be controlled by memory 24 and processor 22 to configure, based on the information, the user equipment with at least one time offset to account for at least one delay on switching from one transmit beam to another transmit beam. According to certain example embodiments, the configuring may include defining at least one rule applicable to the at least one time offset.

Further example embodiments may provide means for performing any of the functions or procedures described herein. For example, certain example embodiments may be directed to an apparatus that includes means for receiving, from a network, a configuration with at least one time offset to account for at least one delay on switching from one transmit beam to another transmit beam. In certain example embodiments, the configuration may define at least one rule applicable to the at least one time offset. The apparatus may also include means for determining a need for the at least one time offset between consecutive repetitions based on the configuration and a use of transmit beams for the consecutive repetitions. The apparatus may further include means for applying, based on the determination, the at least one time offset between the consecutive repetitions, wherein a time domain allocation of at least one repetition of the consecutive repetitions is changed to accommodate the at least one time offset.

Other example embodiments may be directed to a further apparatus that includes means for receiving information of an amount of time needed for a user equipment to switch from one transmit beam to another transmit beam. The apparatus may also include means for configuring, based on the information, the user equipment with at least one time offset to account for at least one delay on switching from the one transmit beam to the another transmit beam. In certain example embodiments, the configuring may include defining at least one rule applicable to the at least one time offset.

Certain example embodiments described herein provide several technical improvements, enhancements, and/or advantages. In some example embodiments, it may be possible to provide solutions that enable UL beam diversity essentially for PUSCH repetition Type B with multi-TRP operation taking into account beam switching delay(s). Thus, with certain example embodiments, it may be possible for PUSCH repetition Type B with UL beam diversity to work properly with full flexibility. Other example embodiments may improve reliability and latency of PUSCH, including in FR2.

A computer program product may include one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary 5G 5$^{th}$ Generation
5GS 5G System
DCI Downlink Control Information
DL Downlink
eNB Enhanced Node B
eURLLC Enhanced URLLC
gNB 5G or Next Generation NodeB
LTE Long Term Evolution
MAC CE Medium Access Control Element
NR New Radio
PUCCH Physical Uplink Control Channel
PUSCH Physical Uplink Shared Channel
PDCCH Physical Downlink Control Channel
PDSCH Physical Downlink Shared Channel
RAN Radio Access Network
SRI SRS Resource Indicator
SRS Sounding Reference Signal
TB Transport Block
TCI Transmission Configuration Indicator
TDM Time Division Multiplexing
TRP Transmission Reception Point
UE User Equipment
UL Uplink
URLLC Ultra-Reliable Low-Latency Communication

We claim:

1. A method, comprising:
receiving, from a network, a configuration with at least one time offset to account for at least one delay on switching from one transmit beam to another transmit beam, wherein the configuration defines at least one rule applicable to the at least one time offset;
determining a need for the at least one time offset between consecutive repetitions based on the configuration and a use of transmit beams for the consecutive repetitions; and
applying, based on the determination, the at least one time offset between the consecutive repetitions, wherein a time domain allocation of at least one repetition of the consecutive repetitions is changed to accommodate the at least one time offset,
wherein for pairs of consecutive actual physical uplink shared channel repetitions for which the at least one time offset is required, wherein the at least one memory and computer program code are further configured, with the at least one processor, to cause the apparatus to perform at least one of:
muting at least one symbol that overlaps with a corresponding at least one time offset, wherein the at least one time offset is applied from a last symbol of an earlier actual physical uplink shared channel repetition of a pair of consecutive actual physical uplink shared channel repetitions,
muting at least one symbol from each actual physical uplink shared channel repetition of a pair of consecutive actual physical uplink shared channel repetitions to facilitate at least one time offset between repetitions, muting at least one symbol from the actual physical uplink shared channel repetition of a pair of consecutive actual physical uplink shared channel repetitions with a lower or larger number of symbols, or
muting at least one symbol from at least one actual physical uplink shared channel repetition of a pair of consecutive actual physical uplink shared channel repetitions by muting symbols in an even manner between the actual physical uplink shared channel repetitions.

2. A non-transitory computer readable medium comprising program instructions stored thereon for performing at least the method according to claim 1.

3. An apparatus, comprising:
at least one processor; and
at least one memory comprising computer program code, the at least one memory and computer program code are configured, with the at least one processor, to cause the apparatus at least to perform:
receiving, from a network, a configuration with at least one time offset to account for at least one delay on switching from one transmit beam to another transmit beam, wherein the configuration defines at least one rule applicable to the at least one time offset;
determining a need for the at least one time offset between consecutive repetitions based on the configuration and a use of transmit beams for the consecutive repetitions; and
applying, based on the determination, the at least one time offset between the consecutive repetitions, wherein a time domain allocation of at least one repetition of the consecutive repetitions is changed to accommodate the at least one time offset,
wherein for pairs of consecutive actual physical uplink shared channel repetitions for which the at least one time offset is required, wherein the at least one memory and computer program code are further configured, with the at least one processor, to cause the apparatus to perform at least one of:
muting at least one symbol that overlaps with a corresponding at least one time offset, wherein the at least one time offset is applied from a last symbol of an earlier actual physical uplink shared channel repetition of a pair of consecutive actual physical uplink shared channel repetitions,
muting at least one symbol from each actual physical uplink shared channel repetition of a pair of consecutive actual physical uplink shared channel repetitions to facilitate at least one time offset between repetitions, muting at least one symbol from the actual physical uplink shared channel repetition of a pair of consecutive actual physical uplink shared channel repetitions with a lower or larger number of symbols, or
muting at least one symbol from at least one actual physical uplink shared channel repetition of a pair of consecutive actual physical uplink shared channel repetitions by muting symbols in an even manner between the actual physical uplink shared channel repetitions.

4. The apparatus according to claim 3, wherein the consecutive repetitions correspond to actual physical uplink shared channel repetitions.

5. The apparatus according to claim 4, wherein the actual physical uplink shared channel repetitions are determined based on a channel segmentation operation.

6. The apparatus according to claim 3, wherein the at least one memory and computer program code are further configured, with the at least one processor, to cause the apparatus to perform determining at least one updated actual physical uplink shared channel repetition based on the application of the at least one time offset and the at least one rule applicable or associated to the at least one time offset.

7. The apparatus according to claim 3, wherein the at least one time offset between two consecutive repetitions is applied only based on the determination of a need for the at least one time offset and when each repetition is associated with a different transmit beam.

8. The apparatus according to claim 3, wherein the determining the need for the at least one time offset comprises determining a feasibility of applying the at least one time offset based on the at least one rule for at least one pair of consecutive repetitions.

9. The apparatus according to claim 3, wherein the configuration comprises a mapping principle for actual physical uplink shared channel repetitions or nominal physical uplink shared channel repetitions with indicated beams.

10. The apparatus according to claim 3, wherein the at least one memory and computer program code are further configured, with the at least one processor, to cause the apparatus to perform discarding at least one actual physical uplink shared channel repetition as a result of applying the at least one time offset.

11. The apparatus according to claim 3, wherein the at least one memory and computer program code are further configured, with the at least one processor, to cause the apparatus to perform updating a duration of at least one actual physical uplink shared channel repetition as a result of applying the at least one time offset and the at least one rule.

12. The apparatus according to claim 3, wherein when consecutive actual physical uplink shared channel repetitions use the same beam, the at least one time offset is not applicable between the actual physical uplink shared channel repetitions.

13. The apparatus according to claim 3, wherein the at least one memory and computer program code are further configured, with the at least one processor, to cause the apparatus to perform accounting for unused or invalid uplink symbols, downlink symbols, and/or flexible symbols when the at least one time offset overlaps with the unused or invalid uplink symbols, the downlink symbols, or the flexible symbols.

14. The apparatus according to claim 3,
wherein the configuration comprises an indication of a plurality of invalid symbol patterns,
wherein each pattern of the plurality of invalid symbol patterns is associated with at least one entry of a related configured time domain resource allocation table, and
wherein the plurality of invalid symbol patterns take into account at least one beam switching delay.

15. The apparatus according to claim 3,
wherein the transmit beam comprises at least one of following: uplink beam, uplink transmission configuration indicator state, spatial relation information, sounding reference signal resource indicator, and uplink transmit spatial filter.

16. An apparatus, comprising:
at least one processor; and
at least one memory comprising computer program code, the at least one memory and computer program code are configured, with the at least one processor, to cause the apparatus at least to perform:
receiving information of an amount of time needed for a user equipment to switch from one transmit beam to another transmit beam; and
configuring, based on the information, the user equipment with at least one time offset to account for at least one delay on switching from the one transmit beam to the another transmit beam,
wherein the configuring comprises defining at least one rule applicable to the at least one time offset,
wherein for pairs of consecutive actual physical uplink shared channel repetitions for which the at least one time offset is required, the rule comprises:
muting at least one symbol that overlaps with a corresponding at least one time offset, wherein the at least one time offset is applied from a last symbol of an earlier actual physical uplink shared channel repetition of a pair of consecutive actual physical uplink shared channel repetitions, muting at least one symbol from each actual physical uplink shared channel repetition of a pair of consecutive actual physical uplink shared channel repetitions to facilitate at least one time offset between repetitions, muting at least one symbol from the actual physical uplink shared channel repetition of a pair of consecutive actual physical uplink shared channel repetitions with a lower or larger number of symbols, or muting at least symbol from at least one actual physical uplink shared channel repetition of a pair of consecutive actual physical uplink shared channel repetitions by muting symbols in an even manner between the actual physical uplink shared channel repetitions.

17. The apparatus according to claim 16, wherein the at least one memory and computer program code are further configured, with the at least one processor, to cause the apparatus to perform configuring the user equipment with a mapping principle for an actual physical uplink shared channel repetition or a nominal physical uplink shared channel repetition with indicated beams.

18. The apparatus according to claim 16,
wherein the transmit beam comprises at least one of following: uplink beam, uplink transmission configuration indicator state, spatial relation information, sounding reference signal resource indicator, and uplink transmit spatial filter.

* * * * *